United States Patent [19]

Bridges

[11] E Re. 30,784

[45] Reissued Oct. 27, 1981

[54] GROUP OPERATED CIRCUIT DISCONNECT APPARATUS FOR OVERHEAD ELECTRIC POWER LINES

[76] Inventor: Ronald P. Bridges, 9 S. 681 Brookeridge Rd., Downers Grove, Ill. 60515

[21] Appl. No.: 68,474

[22] Filed: Aug. 20, 1979

Related U.S. Patent Documents

Reissue of:

[64] Patent No.: 4,095,061
Issued: Jun. 13, 1978
Appl. No.: 783,940
Filed: Apr. 1, 1977

[51] Int. Cl.[3] ..... H01H 31/00

[52] U.S. Cl. ..... 200/48 KB; 74/63; 74/469; 200/153 G; 200/337

[58] Field of Search ..... 200/331, 337, 48 A, 200/48 RB, 48 R, 153 G, 153 H, 153 R; 74/469, 63

[56] References Cited

U.S. PATENT DOCUMENTS

| | | | |
|---|---|---|---|
| 1,843,573 | 2/1932 | Matthews | 200/337 |
| 2,207,683 | 7/1940 | Lemmon | 74/469 |
| 2,470,576 | 5/1949 | Pollock et al. | 200/48 R |
| 2,758,167 | 8/1956 | James | 200/48 R |
| 3,126,756 | 3/1964 | Bertling | 200/153 R |

*Primary Examiner*—Stephen P. Garbe
*Attorney, Agent, or Firm*—Wegner, Stellman, McCord, Wiles & Wood

[57] ABSTRACT

A group operated circuit disconnect apparatus for overhead electric power lines has a base in the form of a box-like housing which mounts on a pole, an upright shaft extends through the housing, and a transverse shaft also extends through the housing. A linkage is mounted on the shafts in the housing so that axial rotation of the upright shaft axially rotates the transverse shaft, and this causes three circuit disconnect switches mounted on the housing to be moved simultaneously between closed positions and open positions, or vice versa, as the upright shaft is manually rotated. An end of the housing has a removable closure plate for access to the linkage.

16 Claims, 5 Drawing Figures

24
27
25
19
23
22
11
3.
23
10
22
9
12
U
3.
56
8
55
7
55
59
P
60
58
L
57

23
42
17
29
41
31
31a
34
15
45
46
18
35
38
39
53
32
43
44
43a
44a
52
52a
51
49a
33
36
13
12
28
47
54
48
49
50
14
30a
30
40

29
17
41
15
34
18
35
36
39
37
52
38
51
13
54
52a
33
49
28
49a
47
48
50
14
40

17
29
15
41
18
34
36
35
38
13
52
47
39
52a
54
33
37
28
51
49a
50
49
48
14
40

GROUP OPERATED CIRCUIT DISCONNECT APPARATUS FOR OVERHEAD ELECTRIC POWER LINES

Matter enclosed in heavy brackets [ ] appears in the original patent but forms no part of this reissue specification; matter printed in italics indicates the additions made by reissue.

BACKGROUND OF THE INVENTION

Overhead electric power distribution lines require circuit disconnect means at certain locations; and since such distribution lines commonly operate in a three-phase system, there are three associated lines which ordinarily must be disconnected and reconnected simultaneously. This requires group operated switches, and for safety and convenience during servicing of the lines, it is desirable that a person be able to open and close the circuit disconnect means on the overhead lines from ground level.

Bridges U.S. Pat. No. 3,637,959 discloses a prior art mechanism for group operation of three switches on parallel overhead electric lines. The disconnect switches of U.S. Pat. No. 3,637,959 are mounted in the electric lines; but as indicated in that patent it is also well known to mount such disconnect switches on a cross arm or on a pole top frame.

Prior art group operated circuit disconnect devices have various disadvantages which are eliminated in the apparatus of the present invention. In the first place, the prior art apparatus usually has rotatable or sliding parts which are exposed to the weather where they may become corroded, or where they may become immobilized in the winter because of ice formed on them.

In addition, some commercially available group operated disconnect switches require substantial field adjustment at the time of installation; and this, of course, is to be avoided to the greatest possible extent.

SUMMARY OF THE INVENTION

The principal object of the present invention is to provide an improved group operated circuit disconnect apparatus for overhead electric power lines.

Another object of the invention is to provide such an apparatus in which a base for the three circuit disconnect switches comprises a box-like housing which mounts on top of a pole, with shafts for opening and closing the disconnect switches journalled in the box walls in sealed bearings and with interconnections between the shafts inside the housing where they are completely protected from weather.

Still another object of the invention is to provide group operated, circuit disconnect apparatus which may be completely adjusted in the manufacturer's plant and mounted without field adjustment.

Still another object of the invention is to provide a group operated circuit disconnect apparatus in which manual force is applied to one shaft for the purpose of opening and closing a first switch, with power from that shaft being transmitted to another shaft, through a very simple mechanical driving connection, so that movement of the first shaft also moves the second shaft so that all three switches are opened and closed simultaneously.

THE DRAWINGS

DETAILED DESCRIPTION OF THE INVENTION

Figure 1:
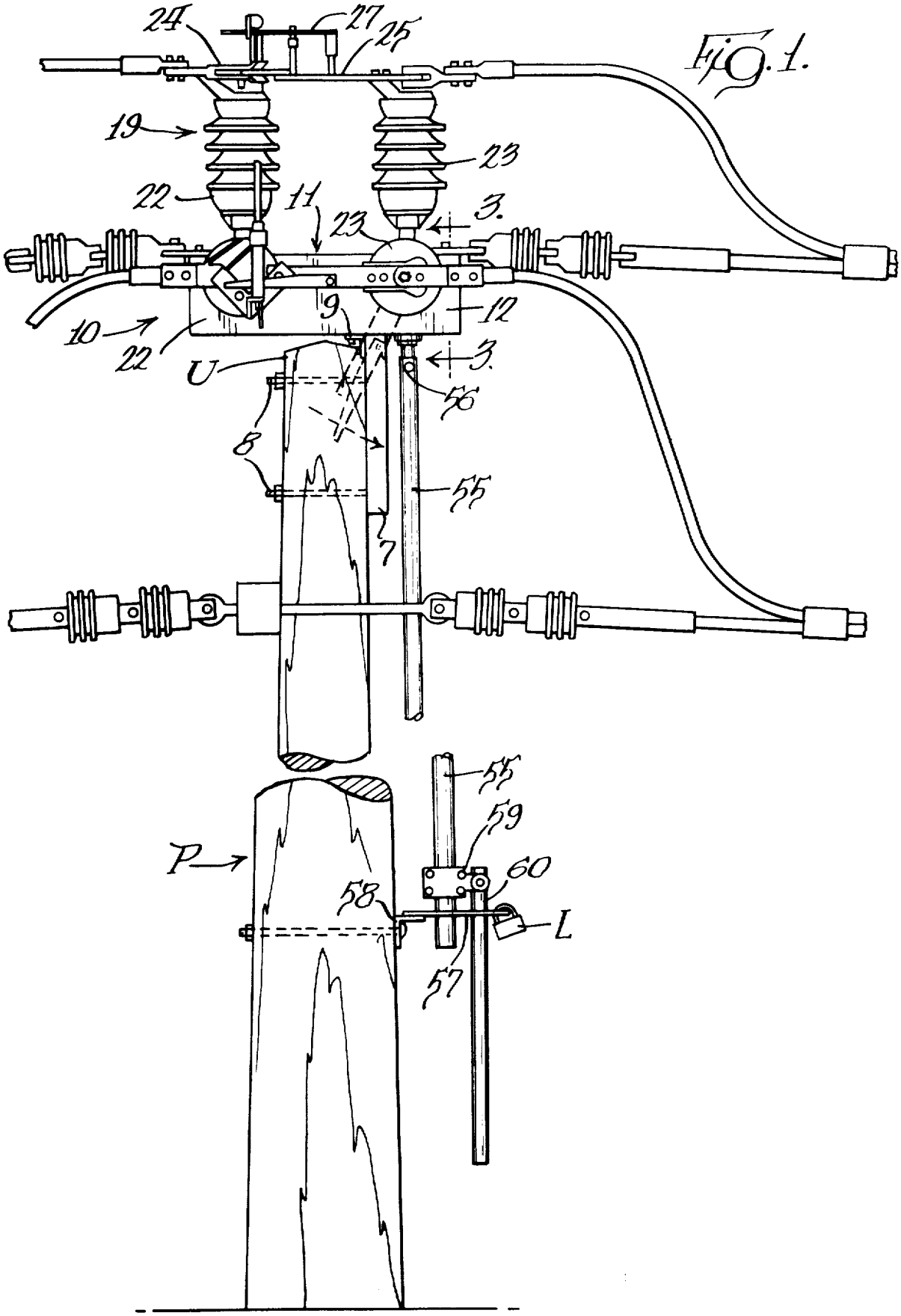
FIG. 1 is a broken, side elevational view of a group operated circuit disconnect apparatus embodying the invention with a switch blade on one of the switches shown in broken lines in its open position.
Figure 2:
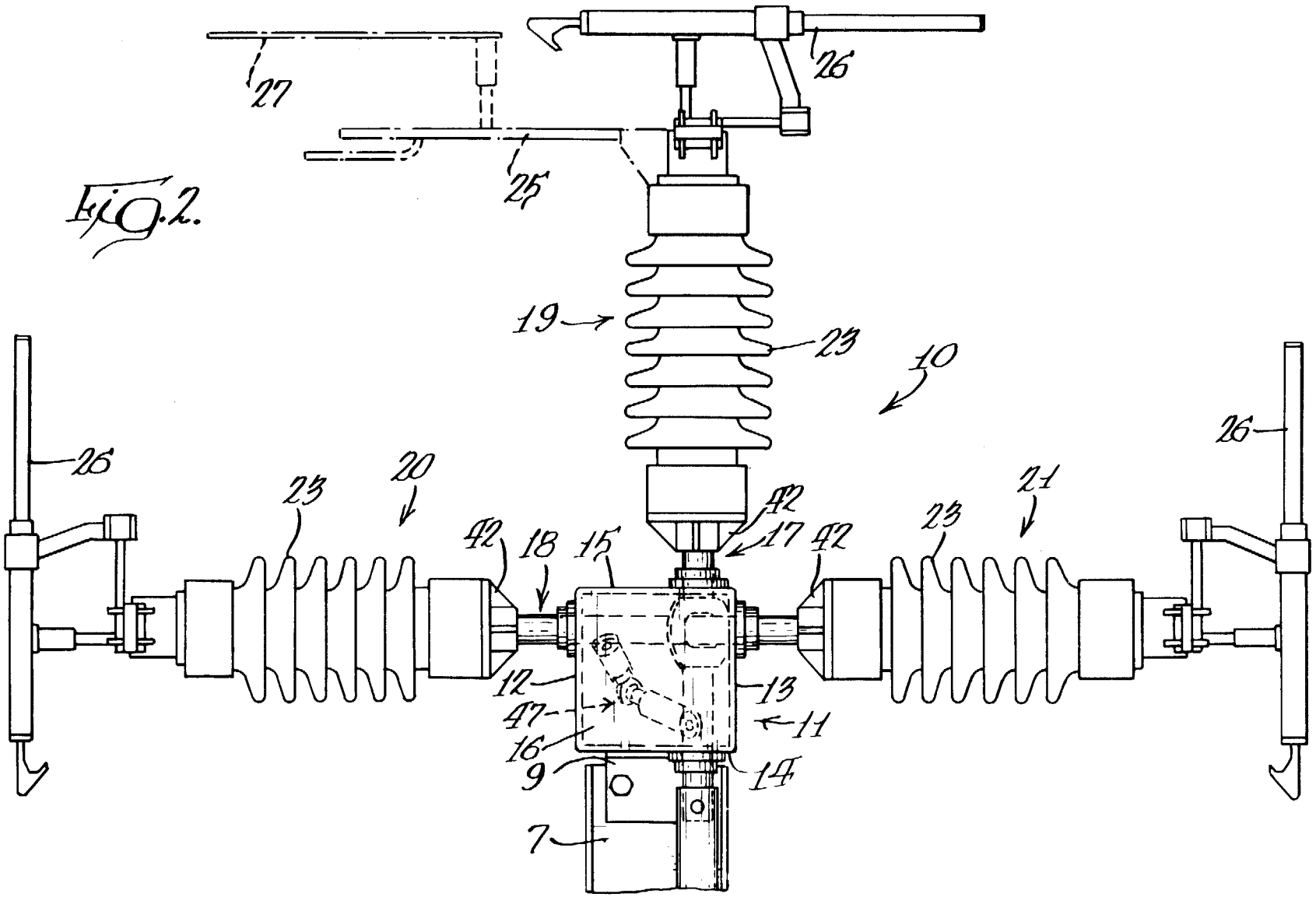
FIG. 2 is an end elevational view on an enlarged scale of the circuit disconnect apparatus of FIG. 1 before it is mounted upon a pole and connected with electric power lines, one switch and an associated operator for a circuit interrupter member being illustrated in broken lines in their open position.

Referring to the drawings in detail, and referring first to FIG. 1, a pole, indicated generally at P, has an upper end U to which a mounting bracket 7 is attached by means of bolts 8. As best seen in FIG. 2, the mounting bracket 7 is a wide channel member, and bolted to its upper end is an angle bracket 9 to which is secured the circuit disconnect apparatus of the present invention, which is indicated generally at 10.

The apparatus 10 includes a base, indicated generally at 11, which consists of a box-like housing having side walls 12 and 13, a bottom wall 14 and a top wall 15. The base 11 has removable closures, such as the closure 16 seen in FIG. 2, at both of its ends.

Extending through the base 11 is an upright shaft means, indicated generally at 17, and transverse shaft means, indicated generally at 18. A first disconnect switch, indicated generally at 19, surmounts the base 11 and is operated by rotation of the upright shaft means 17; while second and third disconnect switches 20 and 21 are mounted, respectively, upon the base side walls 12 and 13 for operation by rotation of the transverse shaft means 18.

The three disconnect switches are identical, and are seen in FIG. 1 to consist of a fixed insulator 22, a rotatable insulator 23 which is mounted upon the shaft means 17 or the shaft means 18, a fixed jaw 24 mounted upon the fixed insulator 22, and a blade 25 which is mounted upon the rotatable insulator 23 for movement between a normal position in which it is held in the jaw 24 and an open position rotated about 90° from the fixed position as shown by the broken lines in FIGS. 1 and 2. If necessary for the particular operating conditions, each of the disconnect switches 19, 20 and 21 may be provided with an interrupter member 26 which is operated by an arm 27 on the blade 25. The particular interrupter member and actuating arm illustrated in the drawings are those of applicant's allowed, copending U.S. Pat. application Ser. No. 623,792, filed Oct. 20, 1975.

Figure 3:
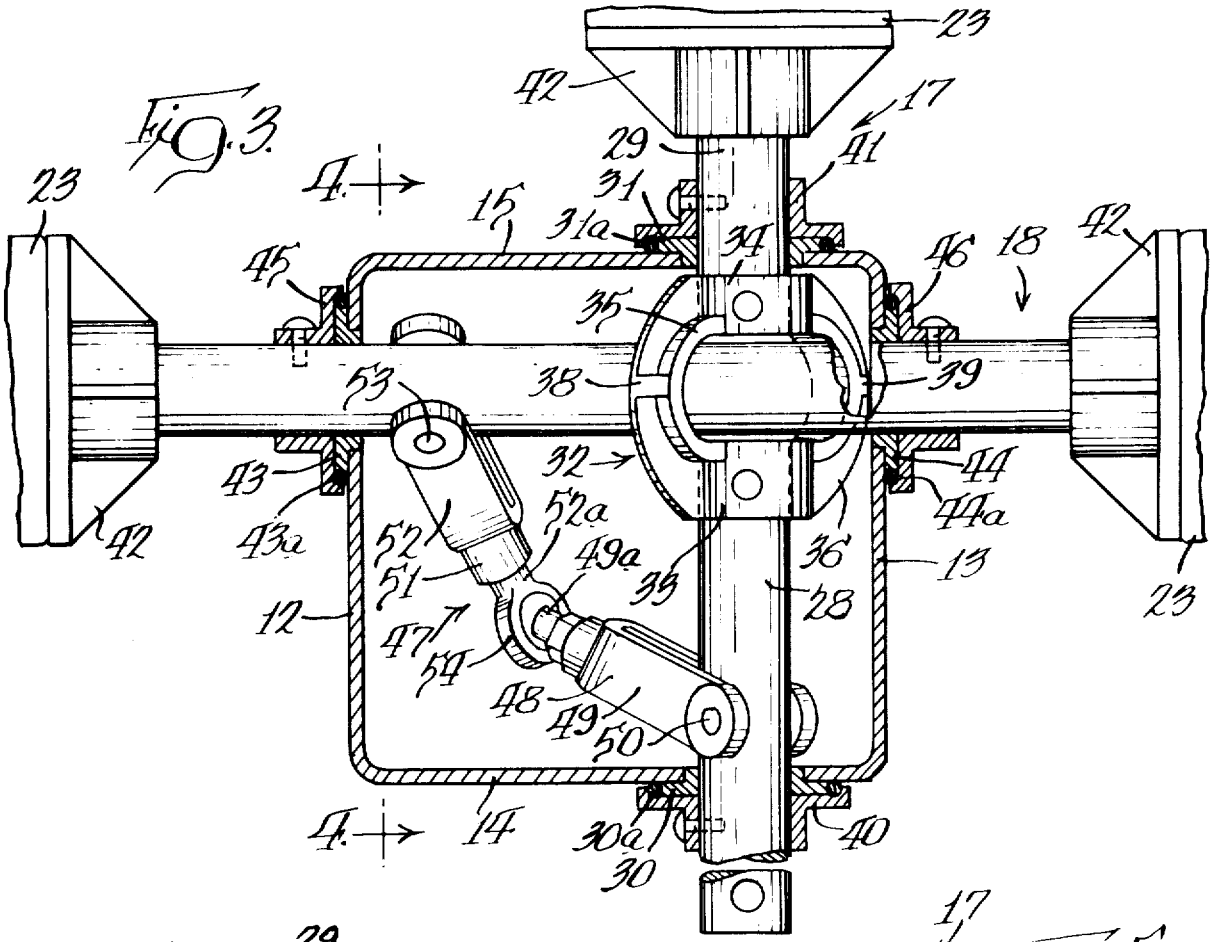
FIG. 3 is a fragmentary sectional view on an enlarged scale, with parts broken away, taken substantially as indicated along the line 3—3 of FIG. 1 and showing the shafts and mechanical interconnections in the positions that they occupy when the switches are closed.
Figure 4:
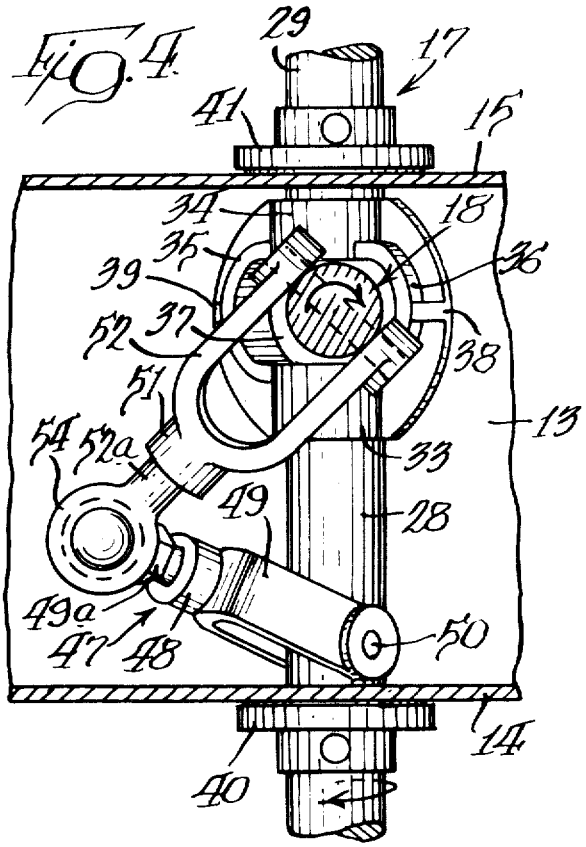
FIG. 4 is a fragmentary sectional view taken substantially as indicated along the line 4—4 of FIG. 3.
Figure 5:
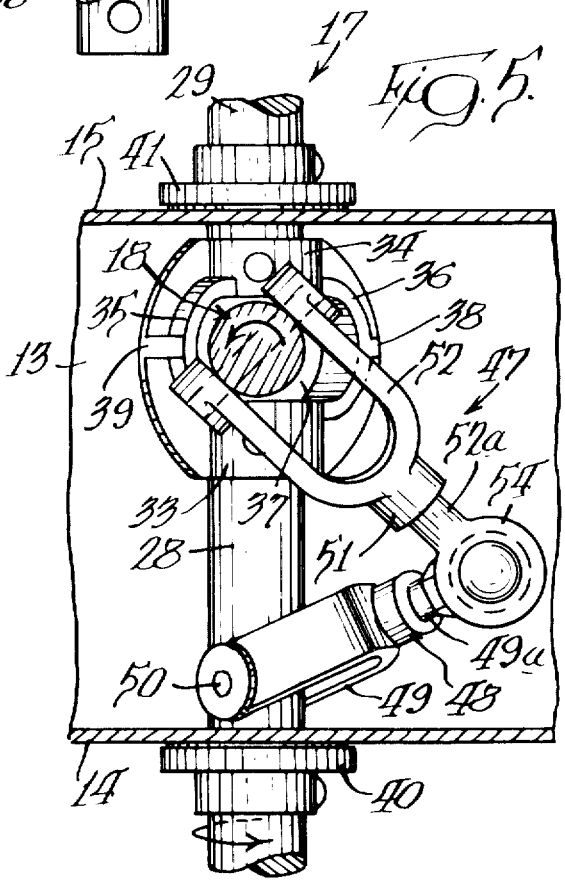
FIG. 5 is a view like FIG. 4 showing the parts in the positions that they occupy when the disconnect switches are open.

Referring now to FIGS. 3, 4 and 5, the upright shaft means 17 consists of axially aligned lower and upper shaft members 28 and 29 which are journalled in bearings 30 and 31, respectively, which are press fitted into holes in the bottom and top walls, respectively, of the base 11. O-rings 30a and 31a surround the respective bearings 30 and 31. The upright shaft means 17 also includes a yoke 32 having a lower collar 33 secured to the lower shaft member 28 and an upper collar 34 secured to the upper shaft member 29; and the collars 33 and 34 are connected by arcuate members 35 and 36 which define an opening 37 between the ends of the shaft members 28 and 29; and the transverse shaft means 18 extends through said opening 37. Thus, the longitudinal axes of the shaft means 17 and 18 lie in the same vertical and horizontal planes.

The arcuate member 35 carries a stop lug 38 and the arcuate member 36 carries a stop lug 39. When the disconnect switches 19, 20 and 21 are in their normal positions the stop lug 39 is abutted against the base side wall as seen in FIGS. 3 and 4; while in the open position of the interrupter switches the stop lug 38 is abutted against the side wall 13 as seen in FIG. 5.

The bottom shaft member 28 and the top shaft member 29 are so connected by the yoke 32 that a lower bearing collar 40 and an upper bearing collar 41 which are fixed on the respective lower and upper shaft members bear against the bearings 30 and 31 so as to substantially eliminate end play in the vertical shaft means 17. Surmounting the upper shaft member 29 is a fitting 42 which carries the rotatable insulator 23 of the first circuit disconnect switch 19.

The shaft means 18 is one piece, and is journalled in bearings 43 and 44 which are press fitted, respectively, into holes in the base side walls 12 and 13. A bearing collar 45 abuts the bearing 43, and a bearing collar 46 abuts the bearing 44, to substantially eliminate end play in the transverse shaft 18. O-rings 43a and 44a surround the respective bearings 43 and 44. At the two ends of the transverse shaft are fittings 42 which receive the rotatable insulators 23 of the disconnect switches 20 and 21, respectively.

A mechanical connection, indicated generally at 47, interconnects the upright shaft means 17 and the transverse shaft means 18 so that rotation of the shaft means 17 causes substantially equal rotation of the shaft means 18. The mechanical connection 47 comprises a first link 48 which has a bifurcated end portion 49 the arms of which flank the lower shaft member 28 so that the first link 48 may be pivotally mounted upon the lower shaft member by means of a pin 50. A second link 51 has a bifurcated portion 52 the arms of which flank the shaft means 18 so that the second link 51 may be pivoted on the shaft means 18 by means of a pin 53. Each link also includes a threaded stem, numbered 49a and 52a, respectively, which screws into a threaded bore in the bifurcated portion for adjusting the lengths of the links. The links 48 and 51 are joined by a ball and socket connection 54 so that they are capable of limited universal movement with respect to one another.

Simultaneous operation of all three circuit interrupter switches 19, 20 and 21 from ground level is provided by an upright operating shaft 55 the upper end portion 56 of which is provided with a socket in which the lower end portion of the lower shaft member 28 is received, and the upright operating shaft 55 is fixed to the shaft member 28 by a pin which impales registering holes in said upper end portion 56 and in said lower end portion. The lower end portion of the upright operating shaft 55 is rotatably received in a hole in a locking plate 57 which is bolted to the lower portion of the pole P by a bracket 58. A pivot clamp 59 clamped onto the operating shaft 55 just above the locking plate 57 pivotally mounts an operating handle 60 which is flanked by spaced arms of the locking plate 57 so that a padlock L may be used on the locking plate 57 to prevent any unauthorized person from opening the switches. When the padlock is removed from the locking plate 57, the operating handle 60 may be swung to a horizontal position where it affords ample leverage for rotating the operating shaft 55 90° to open all three of the disconnect switches 19, 20 and 21. The three switches are returned to their normal position by reverse rotation of the operating shaft 55 using the handle 60.

The foregoing detailed description is given for clearness of understanding only and no unnecessary limitations should be understood therefrom as modifications will be obvious to those skilled in the art.

I claim:

1. A group operated electric circuit disconnect apparatus for a plurality of overhead electric power distribution lines carried on poles, said apparatus comprising, in combination:

a base adapted to be mounted adjacent the top of a pole;

a base disconnect switch surmounting the base;

second and third disconnect switches mounted at opposite sides of the base;

an upright shaft means journalled on said base, said upright shaft means being operatively connected to said first switch so that axial rotation of the shaft means opens and closes the first switch, said upright shaft means having a lower end adapted to be operatively connected to means by which it may be manually rotated;

transverse shaft means journalled on said base and operatively connected to said second and third switches so that axial rotation of said transverse shaft means opens and closes said second and third switches;

and a mechanical connection between said upright shaft means and said transverse shaft means so that axial rotation of the upright shaft means causes axial rotation of the transverse shaft means.

2. The combination of claim 1 in which the base is a box-like housing, the upright shaft means and the transverse shaft means penetrate said housing and have portions within the housing, the mechanical connection is in the housing, and seals surround the shaft means where they penetrate the housing.

3. The combination of claim 2 in which the housing has a removable end wall for access to the mechanical connection.

4. The combination of claim 1 in which the transverse shaft means consists of a single shaft which has one end operatively connected to the second switch and the other end operatively connected to the third switch.

5. The combination of claim 4 in which the upright shaft means comprises a lower shaft member journalled below the transverse shaft means, an upper shaft member journalled above the transverse shaft means, said lower and upper shaft members having their axes aligned and in the same vertical plane with the axis of the transverse shaft means, and a yoke which bridges the transverse shaft means and connects said shaft members.

6. The combination of claim 5 in which the mechanical connection comprises a first link pivoted on one of said shaft members, on a horizontal axis, a second link pivoted on the transverse shaft means on a horizontal axis, and a ball and socket joint connecting the free ends of said links.

7. The combination of claim 6 in which one of said links includes a hollow threaded base and a threaded stem screwed into said base so the length of said one of said links is adjustable.

8. The combination of claim 6 in which the first link is pivoted on the lower shaft member.

9. The combination of claim 8 in which said first link includes a hollow threaded base and a threaded stem screwed into said base so the length of said first link is adjustable.

10. The combination of claim 6 in which the base is a box-like housing having bottom and top walls and side walls, the lower shaft member is journalled in said bottom wall, the upper shaft member is journalled in said top wall, the transverse shaft means is journalled in said side walls, seals surround the shaft members and the shaft means at said walls, and the links are within the housing.

11. The combination of claim 10 in which the housing has a removable end wall for access to the links and the yoke.

12. The combination of claim 10 in which the yoke has two parts which bridge the transverse shaft means on opposite sides, and there is a stop lug on each of said yoke parts, one of said lugs abutting a side wall of the housing when the switches are fully closed and the other of said lugs abutting said side wall when the switches are fully open.

13. The combination of claim 1 which includes stop lugs on opposite sides of one of said shaft means, one of said lugs abutting a part of the base when the switches are fully closed and the other of said lugs abutting a part of the base when the switches are fully open.

14. The combination of claim 1 in which each switch includes a rotatable element and a switch blade mounted on said element, and each rotatable element is supported directly upon one of the shaft means.

*15. A group operated electric circuit disconnect apparatus for a plurality of overhead electric power distribution lines carried on poles, said apparatus comprising, in combination:*

*a base adapted to be mounted adjacent the top of a pole;*

*a first disconnect switch surmounting the base;*

*second and third disconnect switches mounted at opposite sides of the base;*

*an upright shaft means journalled on said base, said upright shaft means being operatively connected to said first switch so that axial rotation of the shaft means opens and closes the first switch;*

*transverse shaft means journalled on said base and operatively connected to said second and third switches so that axial rotation of said transverse shaft means opens and closes said second and third switches;*

*means on one of said shaft means to which a rotational force may be applied to rotate said one of said shaft means axially;*

*and a mechanical connection between said upright shaft means and said transverse shaft means so that axial rotation of said one of said shaft means causes axial rotation of the other of said shaft means.*

*16. The combination of claim 15 in which said means to which a rotational force may be applied is on the upright shaft means.*

* * * * *